United States Patent
Hethcock et al.

(10) Patent No.: US 9,067,676 B1
(45) Date of Patent: Jun. 30, 2015

(54) CONVERTIBLE HELICOPTER RING MEMBER

(71) Applicant: Bell Helicopter Textron Inc., Fort Worth, TX (US)

(72) Inventors: J. Donn Hethcock, Colleyville, TX (US); Mark E. Dreier, Arlington, TX (US); Dudley Smith, Arlington, TX (US); Robert Lee Robinson, Mansfiled, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/308,943

(22) Filed: Jun. 19, 2014

(51) Int. Cl.
   *B64C 27/82* (2006.01)
(52) U.S. Cl.
   CPC ......... *B64C 27/82* (2013.01); *B64C 2027/8254* (2013.01); *B64C 2027/8263* (2013.01)
(58) Field of Classification Search
   CPC  B64C 27/20; B64C 27/82; B64C 2027/8284; B64C 2027/82; B64C 2027/8218; B64C 2027/8254; B64C 2027/8263
   USPC ............ 415/220, 223; 416/1, 189; 244/17.21, 244/17.19, 17.11
   See application file for complete search history.

(56) References Cited

U.S. PATENT DOCUMENTS

| | | | | |
|---|---|---|---|---|
| 2,123,657 A | * | 7/1938 | Munk | 415/220 |
| 2,510,561 A | * | 6/1950 | De Laval | 244/87 |
| 3,222,012 A | * | 12/1965 | Piasecki | 244/51 |
| 3,332,643 A | * | 7/1967 | Toner | 244/7 R |
| 4,506,849 A | | 3/1985 | Lemont | |
| 4,905,932 A | * | 3/1990 | Piasecki | 244/17.19 |
| 5,131,603 A | * | 7/1992 | Meyers | 244/17.19 |
| 5,738,301 A | * | 4/1998 | Francois et al. | 244/17.19 |
| 7,438,259 B1 | * | 10/2008 | Piasecki et al. | 244/6 |
| 8,463,465 B2 | * | 6/2013 | Piasecki et al. | 701/4 |
| 2003/0080242 A1 | | 5/2003 | Kawai | |

FOREIGN PATENT DOCUMENTS

GB   2072601    10/1981
WO   2004/103814   12/2004

OTHER PUBLICATIONS

Invitation pursuant to Rule 62a(1) issued in EP application No. 14183100.8 on Nov. 26, 2014, 2 pages.
European Search Report issued in European Application No. 14183100.8 on Mar. 16, 2015; 4 pages.
Communication pursuant to Article 94(3) EPC issued in European Application No. 14183100.8 on Apr. 1, 2015, 5 pages.

* cited by examiner

*Primary Examiner* — Nathaniel Wiehe
*Assistant Examiner* — Wayne A Lambert
(74) *Attorney, Agent, or Firm* — Fish & Richardson P.C.

(57) ABSTRACT

A convertible helicopter ring member includes a ring member and a drive mechanism. The drive mechanism orients the ring member substantially in-plane with a tail rotor of a helicopter during a first mode of helicopter operation and orients the ring member substantially off-plane with the tail rotor of the helicopter during a second mode of helicopter operation that is different from the first mode.

20 Claims, 5 Drawing Sheets

CONVERTIBLE HELICOPTER RING MEMBER

TECHNICAL FIELD

This disclosure relates to helicopters.

BACKGROUND

Counter-torque tail rotors are often used in helicopters. Tail rotors can be mounted adjacent to vertical fins that provide for aircraft stability. With this configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise. To address these issues, the vertical fin can be replaced by an annular airfoil (sometimes called a ring wing) having an inner diameter greater than the diameter of the tail rotor and which can be mounted around the tail rotor.

SUMMARY

This disclosure describes a convertible helicopter ring member.

Certain aspects of the subject matter described here can be implemented as a helicopter ring member having an inner circumference. The ring member is oriented substantially in-plane with a tail rotor of a helicopter during a first mode of helicopter operation. The ring member is oriented substantially off-plane with the tail rotor of the helicopter during a second mode of helicopter operation that is different from the first mode.

This, and other aspects, can include one or more of the following features. The inner circumference can be sized to surround the tail rotor of the helicopter during the first mode of helicopter operation. The first mode of helicopter operation can be a hover mode. During the hover mode, the ring member can be substantially co-planar with a plane of rotation of the rotor blade. The second mode of helicopter operation can be a flight mode. During the flight mode, the ring member can be substantially perpendicular with a plane of rotation of the rotor blade. An axial width of the ring member can include an airfoil shape.

Certain aspects of the subject matter described here can be implemented as a ring wing for a helicopter. The system includes a ring member and a drive mechanism. The drive mechanism orients the ring member substantially in-plane with a tail rotor of a helicopter during a first mode of helicopter operation and orients the ring member substantially off-plane with the tail rotor of the helicopter during a second mode of helicopter operation that is different from the first mode.

This, and other aspects, can include one or more of the following features. The first mode of helicopter operation can be a hover mode. During the hover mode, the drive mechanism can be configured to orient the ring member to be substantially co-planar with a plane of rotation of the rotor blade. The second mode of helicopter operation can be a flight mode. During the flight mode, the drive mechanism can be configured to orient the ring member to be substantially perpendicular with a plane of rotation of the rotor blade. A mounting system can mount the ring member to a tail boom of the helicopter. The mounting system can be offset from the tail boom to allow the ring member to be rotated around the tail rotor while maintaining a distance between the ring member and the tail rotor. The mounting system can include a fork attached to the tail boom. The ring member can be mounted to the fork. The fork can include an upper end and a lower end attached to an upper pivot position and a lower pivot position, respectively, of the ring member. The fork can include a first slot and a second slot formed at the upper end and the lower end, respectively. The upper pivot position and the lower pivot position can be attached to the first slot and the second slot, respectively. The drive mechanism can be configured to pitch the ring member in the first slot and the second slot. The drive mechanism can include a bell crank system positioned at the first slot and the second slot. A pulley cable system can be connected to the bell crank system. The lower end of the fork is thicker than the upper end of the fork. A C-shaped pitch gimbal ring can be attached to an end of the fork. The ring member can be positioned within the pitch gimbal ring.

Certain aspects of the subject matter described here can be implemented as a method of operating a helicopter. A helicopter ring member, which is attached to a tail boom of a helicopter, is oriented to be substantially in-plane with a tail rotor of a helicopter during a first mode of helicopter operation. In response to input, the helicopter ring member is oriented to be substantially off-plane with the tail rotor of the helicopter during a second mode of helicopter operation.

This, and other aspects, can include one or more of the following features. The second mode of helicopter operation can be a flight mode. During the flight mode, the ring member can be substantially perpendicular with a plane of rotation of the rotor blade. An orientation of the helicopter ring member can be adjusted in the flight mode to adjust at least one of a pitch, roll or yaw angles of the helicopter.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a convertible helicopter ring wing for ground and low speed forward flight. A ring wing surrounding a tail rotor of a helicopter can provide sufficient lateral area to provide transverse stability to the helicopter.

The vortices produced at the tips of the blades of the tail rotor can be captured in a region adjacent the downstream surface of the ring wing. The captured vortices can form a circulating air pattern which can act as a pump to draw additional air through the center of the ring wing from the region adjacent the upstream surface of the ring wing. The circulating air pattern and eduction can increase the diameter of the wake and the volume of air transported by the tail rotor. The wake of the tail rotor can be transported at a slow rate while including a greater mass of air by the operation of the ring wing, thus resulting in increased efficiency in the operation of the tail rotor.

In addition, the ring wing described here can be converted from a position in a butt line plane oriented around the tips of the tail rotor to a station plane oriented with the axis of the ring wing pointed near a forward position. Thus, the ring wing can protect the rotating blades of the tail rotor from coming into contact with people on the ground and/or objects in the air during a hover or slow flight, and provide aerodynamic forces to control aircraft yaw, roll or pitch in forward flight. The ring wing can provide longitudinal pitch trim and lateral yaw trim. In cruise mode, the flow axis of the ring wing is aligned nearly with the long axis of the fuselage to serve as a horizontal stabilizer. In hover mode, the arrangement of the ring wing eliminates the down load of a horizontal tail surface that may arise due to interference with the down wash from the main rotor. The ring wing can also off-load the tail rotor in forward flight by positioning itself with a yaw-direction incidence angle via a pilot trim control, thereby reducing power consumption by the tail rotor. The ring wing presents a surface area in sideward flight, and can thereby serve in a passive roll as a yaw damper. The ring wing can reduce the size of a horizontal stabilizer. Alternatively or in addition, application of a ring wing can allow for the elimination of both vertical and horizontal surfaces normally utilized on conventional helicopters. This can allow a reduction in weight, download for a horizontal stabilizer in the rotor wake and reduced projected side area and drag in lateral (side) flight.

Figure 1:
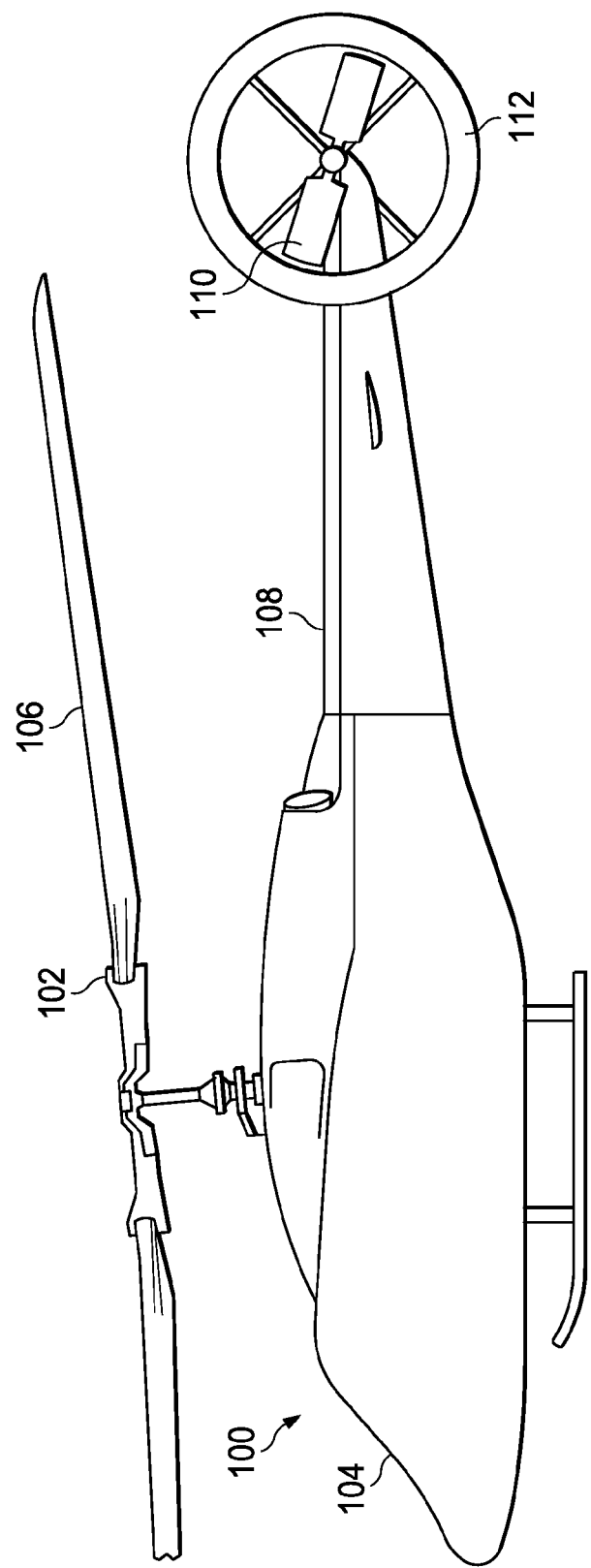
FIG. 1 is a schematic diagram of an elevation view of a helicopter including a ring member.

FIG. 1 is a schematic diagram of an elevation view of a helicopter 100 including a ring member 112. The helicopter 100 includes a rotary system 102 carried by a fuselage 104. Rotor blades 106 connected to the rotary system 102 provide flight for the helicopter 100. The rotor blades 106 are controlled by multiple controllers within fuselage 106. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108 which supports a tail rotor 110 at the aft end. The tail rotor 110 provides counter-torque force for transversely stabilizing the helicopter 100. A ring member 112 is mounted on the tail boom 108 to surround the tail rotor 110. The ring member 112 is centered on the hub of the tail rotor 110 such that a leading edge of the ring member 112 is presented to the side of the helicopter 100 toward which the tail rotor 110 thrusts. For example, when a single main rotor the helicopter 100 is rotating counter-clockwise when viewed from above, the leading edge of the ring member 112 is to the right (starboard) side of the helicopter 100.

The ring member 112 has a circular cross-section with an inner circumference. The ring member 112 can have a constant chord. The inner circumference is sufficient to maintain a clearance around the blades of the tail rotor 110 that is sufficient to allow the ring member 112 to turn from an in-plane orientation to an off-plane orientation, as described below. The ring member 112 has an axial width. The axial width of the ring member 112 can have an airfoil shape. With this shape, the leading edge of the ring member 112 can align itself with the on-coming air when in flight mode and can be aligned with the on-coming axial flow of the tail rotor 110 when in hover mode.

The ring member 112 is oriented substantially in-plane with the tail rotor 110 of the helicopter 100 during a first mode of helicopter operation. For example, the first mode of helicopter operation is any one of a hover mode, a mode in which the helicopter 100 is sitting on the ground with the tail rotor 110 turning or when the helicopter 100 is operating in slow speed flight. In the hover mode, the ring member 112 is substantially co-planar with a plane of rotation of the tail rotor 110 such that the inner circumference of the ring member 112 surrounds the tail rotor 110. In this orientation, the ring member 112 can provide maneuverability and trim to the helicopter operation. The airfoil shape of the axial width of the ring member 112 facilitates efficient air flows past the axial width of the ring member 112 in this orientation. For example, the airfoil shape can provide additional thrust off the ring member 112, thereby decreasing power consumption.

The ring member 112 is oriented substantially off-plane with the tail rotor 110 of the helicopter 100 during a second mode of helicopter operations that is different from the first mode. For example, the second mode of helicopter operation is a flight mode (e.g., a low speed forward flight mode). In the flight mode, an orientation of the ring member 112 is changed from being substantially co-planar with the plane of rotation of the tail rotor 110 to being non-planar. For example, the ring member 112 can be substantially perpendicular with the plane of rotation of the tail rotor 110. Alternatively, the orientation of the ring member 112 can be between co-planar and perpendicular relative to the tail rotor 110. In this orientation, the ring member 112 can serve as a circular airfoil providing up and down movement in pitch trim, and left to right movement in yaw trim.

Figure 2B:
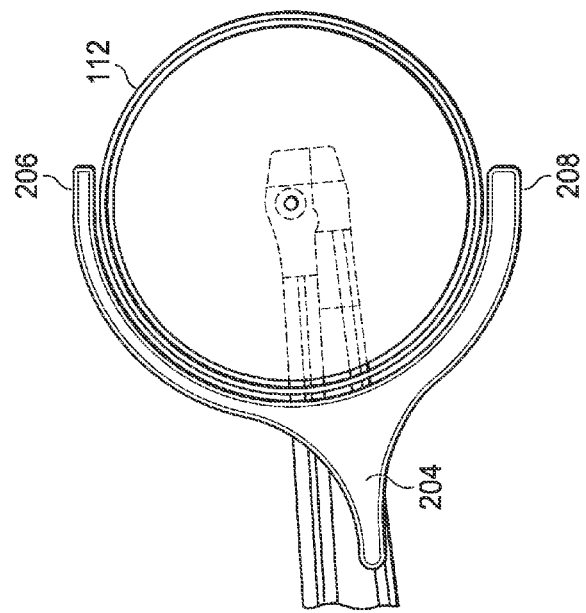
FIG. 2B is a schematic diagram of an elevation view of the ring member oriented in-plane with the tail rotor of the helicopter of FIG. 1.
Figure 2A:
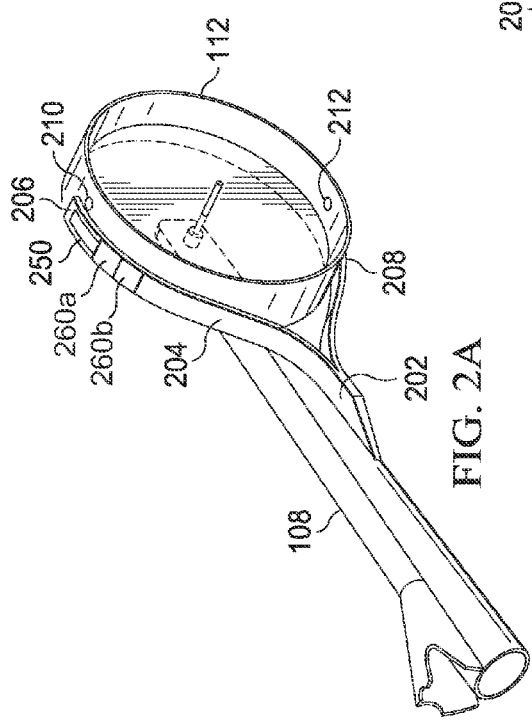
FIG. 2A is a schematic diagram of the ring member oriented in-plane with the tail rotor of the helicopter of FIG. 1.

FIG. 2A is a schematic diagram of the ring member 112 oriented in-plane with the tail rotor 110 of the helicopter 100. The ring member 112 is mounted to the tail boom 108 of the helicopter 100 using a mounting system 202. As shown in FIG. 2A, the mounting system 202 is offset from the tail boom 108 to allow the ring member 112 to be rotated around the tail rotor 110 while maintaining a distance between the ring member 112 and the tail rotor 110. In some implementations, a distance by which the ring member 112 is offset from the tail boom 108 is substantially equal to a distance by which the tail rotor 110 is offset from the tail boom 108. The mounting system 202 includes a fork 204 attached to the tail boom 108. The fork 204 includes an upper end 206 and a lower end 208. The ring member 112 is mounted to the fork 204 between the upper end 206 and the lower end 208. For example, the ring member 112 includes an upper pivot position 210 and a lower pivot position 212 attached to the upper end 206 and the lower end 208, respectively.

FIG. 2B is a schematic diagram of an elevation view of the ring member 112 oriented in-plane with the tail rotor 110 of the helicopter 100. The bottom portion of the fork 204 which includes the lower end 208 can be thicker than the top portion of the fork 204 which includes the upper end 206. When the helicopter 100 flares, e.g., during landing, the tail rotor 110 is at its lowest point creating a risk of contact with the ground. If there is contact, the thicker bottom portion of the fork 204 can provide greater strength to the fork 204 to take the force of contact and decrease (e.g., minimize or prevent) flexing, thereby protecting the tail rotor 110. In some implementations, a stinger can connected to the fork 204 as an alternative or in addition to having a thicker bottom portion to take the force of contact and decrease flexing.

Figure 2C:
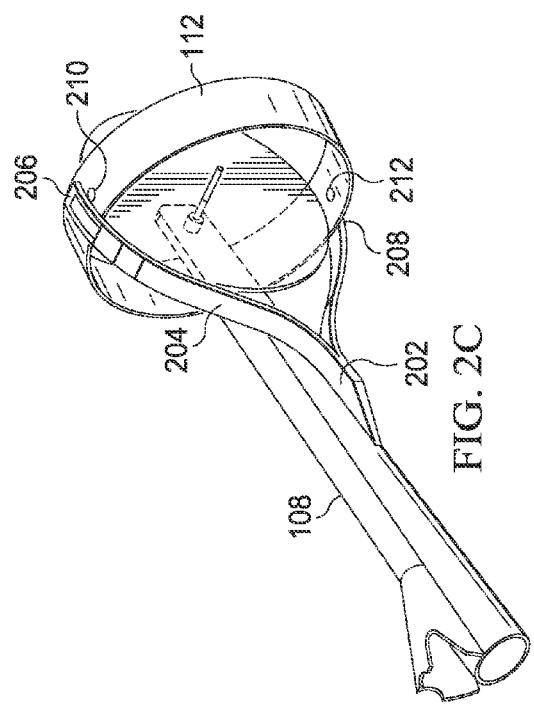
FIG. 2C is a schematic diagram of the ring member oriented off-plane with the tail rotor of the helicopter of FIG. 1.

FIG. 2C is a schematic diagram of the ring member 112 oriented off-plane with the tail rotor 110 of the helicopter 100. As shown in FIG. 2C, the ring member 112 has been rotated on a Z-axis that passes between the upper end 206 and the lower end 208 from an in-plane orientation during a hover mode to an off-plane rotation during a flight mode in which the ring member 112 is substantially perpendicular to a rotational plane of the tail rotor 110. In some implementations, the ring member 112 can be pivoted on a horizontal X-axis to provide yaw control of the helicopter 100. To do so, a first slot 250 and a second slot (not shown) can be formed at the upper end 206 and the lower end 208, respectively, of the form 204. The upper pivot position 210 and the lower pivot position 212 can be attached to the first slot 250 and the second slot, respectively, to allow the ring member 112 to pivot within the slots on the horizontal X-axis.

The drive mechanism and the ring member 112 are included in a ring wing system for the helicopter 100. In some implementations, the drive mechanism can include a bell crank system 260a positioned at the first slot 250 and the second slot, and a pulley cable system 260b connected to the bell crank system 260a. The drive mechanism can, alternatively or in addition, include a work gear system driven by a motor actuator to actuate the ring member 112. The drive mechanism can be controlled by an operator of the helicopter 100 to orient the ring member 112 substantially in-plane with the tail rotor 110 of the helicopter 100 during a first mode of helicopter operation, and to orient the ring member 112 substantially off-plane with the tail rotor 110 of the helicopter 100 during a second mode of helicopter operation that is different from the first mode.

Figure 3A:
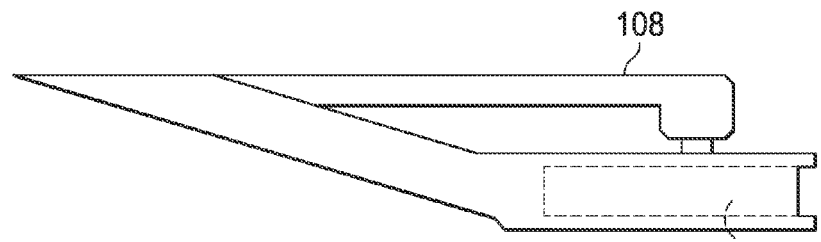
FIGS. 3A and 3B are top views of the ring member in a hover mode and a flight mode, respectively, of helicopter operation.
Figure 3B:
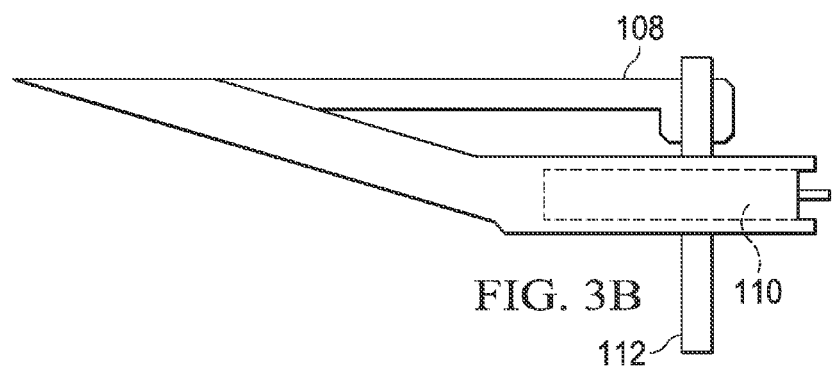

FIGS. 3A and 3B are top views of the ring member 112 in a hover mode and in a flight mode (e.g., cruise mode), respectively, of helicopter operation. When the helicopter 100 is in the hover mode, if the ring member 112 is off-plane relative to the tail rotor 110, the helicopter pilot can operate the drive mechanism to rotate the ring member 112 to be in-plane with the tail rotor 110. The drive mechanism can provide control signals to the pulley cable system 260b, which, in turn, can control the bell crank system 260a to rotate the ring member 112 about the Z-axis that passes between the upper end 206 and the lower end 208 of the ring member 112. The ring member 112 can be in the in-plane orientation when the helicopter 100 is on the ground, e.g., when the rotor blades 106 are rotating or stationary. The ring member 112 can be in the in-plane orientation when the helicopter 100 takes-off. After take-off, the pilot can switch from the hover mode to a flight mode. Either in response to the pilot controlling the drive mechanism or automatically upon determining that the operating mode has changed from hover mode to flight mode, the drive mechanism can operate the ring member 112 to rotate from the in-plane rotation to the off-plane rotation. FIG. 3B shows the ring member 112 being perpendicular to the tail rotor 110.

Figure 3C:
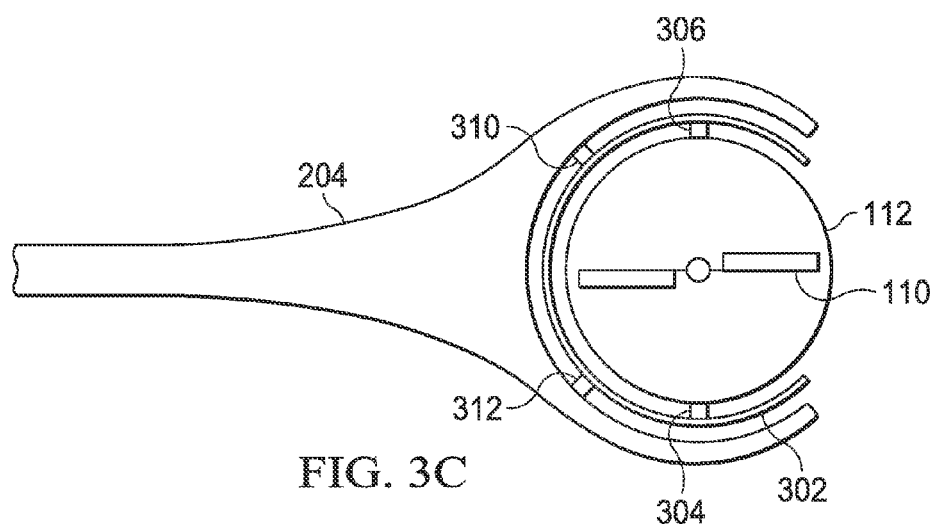
FIG. 3C is a side view of the ring member in a hover mode of helicopter operation.
Figure 3D:
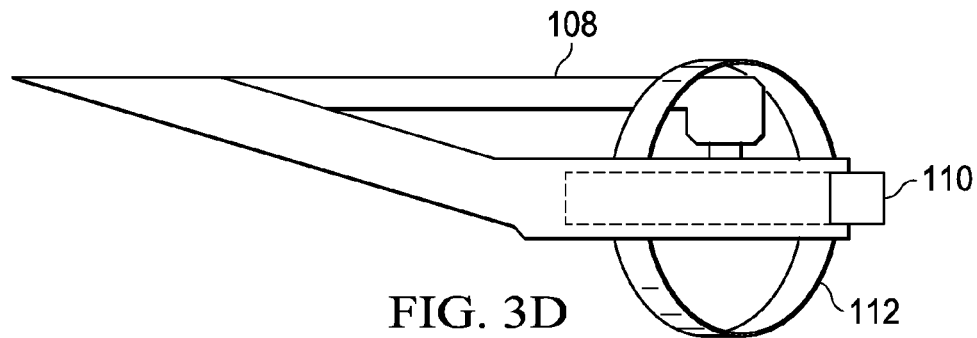
FIGS. 3D and 3E are a top view and a side view, respectively, of a cruise mode of helicopter operation.
Figure 3E:
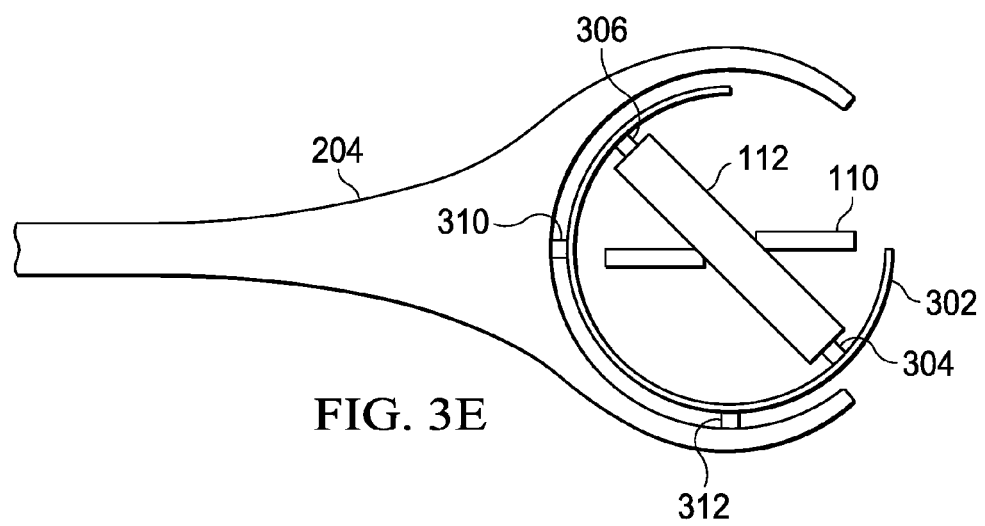

FIG. 3C is a side view of the ring member 112 in a hover mode of helicopter operation. In some implementations, the ring wing system can include a C-shaped pitch gimbal ring 302 as an alternative or in addition to the first slot 250 and the second slot. The pitch gimbal ring 302 be held in place within the fork using pins 310 and 312, and can rotate within the fork 204. The drive mechanism can control the ring member 112 to pivot within the pitch gimbal ring 302. To do so, the pitch gimbal ring 302 can include a lower yaw pin 304 and an upper yaw pin 306 that connect the ring member 112 to the pitch gimbal ring 302. FIGS. 3D and 3E are a top view and a side view, respectively, of a cruise mode of helicopter operation. In the mode shown in FIGS. 3D and 3E, the pilot has operated the drive mechanism to rotate the ring member 112 to be substantially perpendicular to a plane of the tail rotor 110. The drive mechanism can include a worm gear and pinion, and a motor in the interior of the pitch gimbal ring 302 to change from the in-plane orientation to the off-plane orientation (and vice versa). In addition, the pilot has operated the drive mechanism to rotate the pitch axis of the ring member 112 to be 45 degrees. That is, the drive mechanism has been operated to rotate the ring member 112 by 45 degrees about a horizontal X-axis that passes through the center of the ring member 112. In some implementations, the yaw pins 304 and 306 rotate the ring member 112 on tracks formed in the pitch gimbal ring 302 as shown in FIGS. 3D and 3E. Alternatively, the ring member 112 can be rotated within the first slot 250 and the second slot described above.

Figure 4:
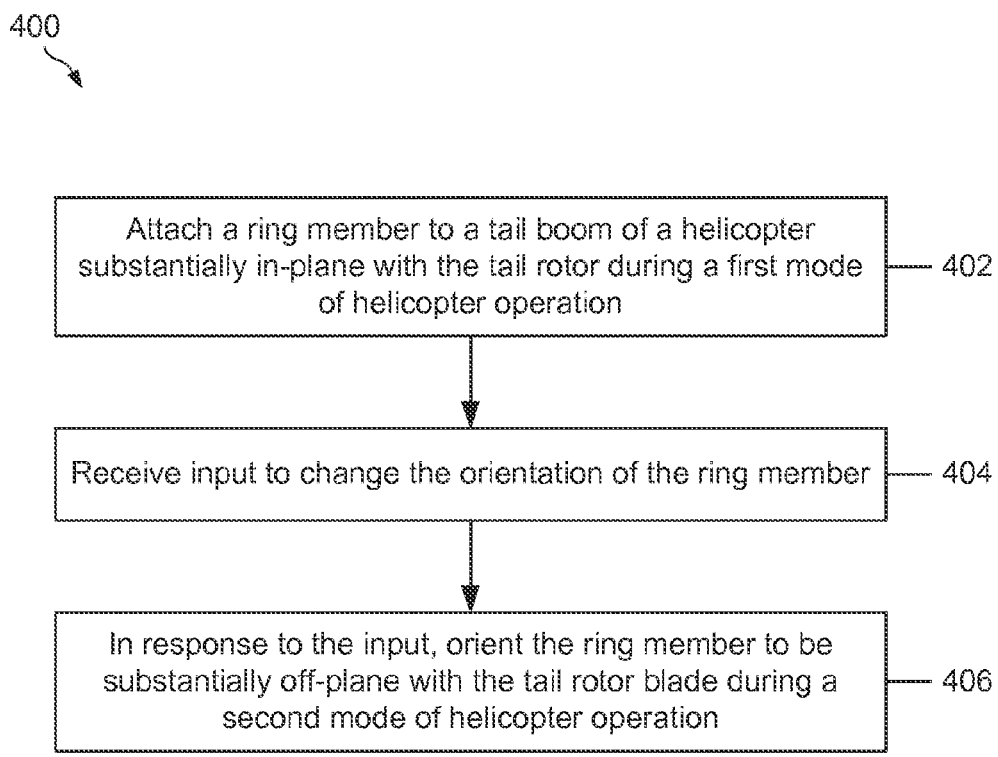
FIG. 4 is a flowchart of an example process for operating the ring member in different orientations.

FIG. 4 is a flowchart of an example process 400 for operating the ring member in different orientations. The process 400 can be initiated by the helicopter pilot and performed by the drive mechanism. At 402, a helicopter ring wing (e.g., the ring member 112) attached to the tail boom 108 of the helicopter 100 is oriented to be substantially in-plane with the tail rotor 110 of the helicopter 100 during a first mode of helicopter operation, e.g., a hover mode. At 404, input is received to change the orientation of the ring member 112. For example, the pilot operates the drive mechanism to change the orientation. At 406 and in response to the input, the helicopter ring wing is oriented to be substantially off-plane with the tail rotor blade of the helicopter during a second mode of helicopter operation.

A number of implementations have been described. Nevertheless, it will be understood that various modifications may be made without departing from the spirit and scope of the disclosure. In some implementations, the ring member can be controlled by pilot inputs in combination with the operating status of the air vehicle (e.g., hover, transition or forward flight). In implementations in which the rotorcraft is operated using some form of fly-by-wire or fly-by-light control systems, the ring wing operation can be controlled by the computer system, which, in turn, can get cues from the pilot's inputs, etc.

The invention claimed is:
1. A helicopter ring member comprising:
a ring member comprising an inner circumference, the ring member to be oriented substantially in-plane with a tail rotor of a helicopter during a first mode of helicopter operation, wherein the first mode of helicopter operation is a hover mode, the ring member to be oriented substantially off-plane with the tail rotor of the helicopter during a second mode of helicopter operation that is different from the first mode.
2. The helicopter ring member of claim 1, wherein the inner circumference is sized to surround the tail rotor of the helicopter during the first mode of helicopter operation.
3. The helicopter ring member of claim 1, wherein the ring member is substantially co-planar with a plane of rotation of the rotor blade during the hover mode.
4. The helicopter ring member of claim 1, wherein the second mode of helicopter operation is a flight mode, and wherein the ring member is substantially perpendicular with a plane of rotation of the rotor blade during the flight mode.
5. The helicopter ring member of claim 1, wherein an axial width of the ring member comprises an airfoil shape.
6. A ring wing system for a helicopter, the system comprising:
a ring member; and
a drive mechanism to orient the ring member substantially in-plane with a tail rotor of a helicopter during a first mode of helicopter operation and to orient the ring member substantially off-plane with the tail rotor of the helicopter during a second mode of helicopter operation that is different from the first mode, wherein the second mode of helicopter operation is a flight mode.

7. The system of claim 6, wherein the first mode of helicopter operation is a hover mode, and wherein the drive mechanism is configured to orient the ring member to be substantially co-planar with a plane of rotation of the rotor blade during the hover mode.

8. The system of claim 6, wherein the drive mechanism is configured to orient the ring member to be substantially perpendicular with a plane of rotation of the rotor blade during the flight mode.

9. The system of claim 6, further comprising a mounting system to mount the ring member to a tail boom of the helicopter.

10. The system of claim 9, wherein the mounting system is offset from the tail boom to allow the ring member to be rotated around the tail rotor while maintaining a distance between the ring member and the tail rotor.

11. The system of claim 9, wherein the mounting system includes a fork attached to the tail boom, wherein the ring member is mounted to the fork.

12. The system of claim 11, wherein the fork includes an upper end and a lower end attached to an upper pivot position and a lower pivot position, respectively, of the ring member.

13. The system of claim 12, wherein the fork includes a first slot and a second slot formed at the upper end and the lower end, respectively, and wherein the upper pivot position and the lower pivot position are attached to the first slot and the second slot, respectively.

14. The system of claim 13, wherein the drive mechanism is configured to pitch the ring member in the first slot and the second slot.

15. The system of claim 14, wherein the drive mechanism includes:
 a bell crank system positioned at the first slot and the second slot; and
 a pulley cable system connected to the bell crank system.

16. The system of claim 12, wherein the lower end of the fork is thicker than the upper end of the fork.

17. The system of claim 11, further comprising a C-shaped pitch gimbal ring attached to an end of the fork, wherein the ring member is positioned within the pitch gimbal ring.

18. A method of operating a helicopter, the method comprising:
 orienting a helicopter ring member attached to a tail boom of a helicopter to be substantially in-plane with a tail rotor of a helicopter during a first mode of helicopter operation, wherein the first mode of helicopter operation is a hover mode; and
 in response to input, orienting the helicopter ring member to be substantially off-plane with the tail rotor of the helicopter during a second mode of helicopter operation.

19. The method of claim 18, wherein the second mode of helicopter operation is a flight mode, and wherein the ring member is substantially perpendicular with a plane of rotation of the rotor blade during the flight mode.

20. The method of claim 19, further comprising adjusting an orientation of the helicopter ring member in the flight mode to adjust at least one of a pitch, roll or yaw of the helicopter.

* * * * *